2,891,891

MIXTURE FOR PREPARING THE LARGE INTESTINE FOR X-RAY PHOTOGRAPHY

Sölve Welin, Malmo, Karl Gösta Ekström, Sodertalje, and Gillis Evert Ruben Stenvall, Malmo, Sweden, assignors to A B Ferrosan, Malmo, Sweden, a corporation of Sweden No Drawing. Application November 29, 1955
Serial No. 549,880

Claims priority, application Sweden December 3, 1954

6 Claims. (Cl. 167—95)

This invention relates to a novel mixture adapted for preparing the large intestines for X-ray photography.

Prior to the instant invention, the technique of X-ray diagnosis had not advanced sufficiently to allow the discovery of small-size cancer tumors, particularly in connection with the large intestine. As it is widely recognized that early discovery of cancerous tumors is extremely important for therapeutic and preventive treatment, it is, of course, highly desirable to improve the X-ray diagnosis techniques along this line. An essential condition in the X-ray photography of the large intestine is a thorough cleaning of this portion of the intestinal tract. Treatment with the known laxatives and/or irrigation of the intestine with a water enema have, however, proved unsatisfactory for preparing the intestine for this purpose as is well known to physicians, surgeons and roentgenologists.

One object of this invention is a preparation which is particularly well-suited for preparing the large intestine for X-ray diagnosis and roentgenography. This and still further objects will become apparent from the following description.

The preparation, in accordance with the invention, comprises a mixture of a laxative and preferably one which is capable of causing Holzknecht's long movements of the bowel (cp. Schinz, Baensch, Friedl, Uehlinger: Lehrbuch der Röntgendiagnostik, vol. IV, "Innere Organe," Pant II, page 3344, Georg Thieme Verlag, Stuttgart, 1952) and a material having a tanning effect and/or an effect of reducing the mucous secretion of the intestinal walls as, for example, tannin (penta-digalloyl-glycose) or other tanning agents of vegetable origin such as mimosa, chestnut, quebracho, or synthetic tanning agents or aluminum subacetate. Examples of laxatives capable of producing Holznecht's long movements include certain isatine derivatives such as diphenol isatine, and $\alpha$-pyridyl-di-(p-hydroxyphenyl)-methane and esters thereof, especially $\alpha$-pyridyl-di-p-(acetoxyphenyl)-methane.

The materials having the tanning effect and/or an effect reducing the mucous secretion of the large intestine should be present in the mixture in an amount of about 20 to 2000 times and preferably 200–500 times an amount by weight of the laxative. A very small proportion of laxative is sufficient if, in a manner as described below, special steps are taken to increase the rate of solubility of the preparation and especially of its laxative component. In such cases, it has been found that the preparation should preferably contain about 0.2 weight percent of laxative while otherwise the amount of this component should be somewhat higher, for instance 0.5 weight percent.

The preparation is used to form an enema solution. For this purpose, the preparation is dissolved in water in amount so that one liter of solution will contain, for example, 5 grams of material having a tanning effect or an effect reducing the mucous secretion of the large intestine such as tannin and 25 milligrams of the laxative.

The enema solution as formed, in accordance with the invention, is used at about body temperature to irrigate the large intestine prior to the X-ray photography. For this purpose, it is necessary to apply two enemas, the first one comprising the above described solution of the preparation in accordance with the invention. When the intestines have been emptied and thus liberated from excrements using this solution, the treatment is followed by a treatment with a second enema containing a suspension of barium sulfate and, in addition, the preparation in accordance with the invention. The second enema is made in the usual way with a barium sulfate suspension of the type common for X-ray purposes. Such suspensions as a rule contain from 0.5 to 1.5 kilograms of barium sulfate per 1 liter of water, preferably 1 kilogram of barium sulfate per 1 liter of water. Certain variations in the barium sulfate concentration depend on the degree of fineness of the suspended barium sulfate; in common practice, the barium sulfate concentration is adjusted to the desired degree with the aid of an aerometer provided with an empirical scale and produced by Svenska AB Philips ("Ba-Test"), the suspension being preferably adjusted to the scale value 7.5. To this suspension the laxative and tanning components are then added in the same proportions as to the solution for the first enema.

The effect of the preparation, in accordance with the invention, is not only that of emptying the intestines very efficiently, but also preparing the intestines in such a manner as to permit an increased adhesion of the X-ray contrast medium to the inner intestinal wall. After the second enema treatment air is introduced through the anus into the bowel in accordance with a known technique. In this manner the intestine becomes inflated, as the valvula Bauhini prevents the air from escaping upwardly. Simultaneously with this inflation, the wall of the intestine is lined with an extremely thin and uniform wallpaper-like coating, the thickness of the coating being as a rule from 0.1 to 1 millimeter. Due to the very thin, smooth and adhesive coatings of barium sulfate thus obtained it becomes possible to discover in the X-ray photography, very small neoplasms in the large intestine, such as would not have been visible without the use of the new preparation in accordance with the invention.

The novel preparation, in accordance with the invention, and particularly the laxative component thereof, is often not as soluble in water as might be desired. In accordance with a preferred embodiment of the invention, the rate of solubility of the preparation in water is substantially increased. For this purpose, both components of the preparation are first dissolved in a water-miscible organic solvent as, for example, acetone, methanol, ethanol, methylal, methyl glycol, dioxane, or mixtures thereof, and thereafter the solvent solution is evaporated and dried. The drying may, for example, be effected by spray drying in the conventional manner. It has been found that despite this drying, a certain amount of the solvent is retained in the preparation, possibly due to the formation of a solvate of the laxative component and/or of the tanning component. After this treatment, the whole product, i.e. also its laxative component, is readily soluble in water which may at least partially be due to the presence of this solvate.

In accordance with this embodiment, it has been found desirable to first form the mixture containing an excess quantity of the laxative component as compared with the final end product and after the dissolving in the organic solvent and drying, to admix a further quantity of the component having the tanning effect and/or an effect of reducing the mucous secretion of the intestinal walls so that the desired ratio of components is obtained.

From practical experiments it has been found to be particularly suitable to dissolve, for example, 2.6 grams of the laxative component in 100 grams of the tanning component in 100 grams of solvent. After the evaporation and drying, the resultant product may be admixed, for example, with twelve times a greater amount of the tanning component to thus provide a product containing 20 milligrams of the laxative to 10 grams of the tanning agent. The dissolving in the organic solvent followed by the drying may be used to convert the mixture into particularly finely divided condition which aids in the subsequent dissolving in water. When preparing the preparation, in accordance with this embodiment, it has been found sufficient to use only comparatively small amounts of the laxative, which may be due to the high solubility. While in the preparations produced in accordance with other embodiments of the invention it is desired to employ 0.5% by weight of the laxative, when producing the preparation in accordance with this embodiment, it has been found sufficient to use a laxative content amounting to only about 0.2 weight percent.

Even when produced according to this improved modification of the process, the preparations are dry to the touch in spite of the fact that they contain a certain amount of the solvent employed. Probably, the solvent retained in the preparation has replaced a portion of the water commonly present in the tanning component. Commercial tannin, for example, contains about 8 to 10 percent of water. The drying operation is preferably effected under mild conditions as, for example, in vacuo at a temperature of e.g. 20–60° C., or by spray drying, at a temperature suitable for the solvent.

With the use of the preparation, in accordance with the invention, even very small tumors will become apparent in X-ray photography. Experiments have shown that tumors which were so small that they could only be discovered with the aid of a magnifying glass, were all benign and indications are that a portion of these small tumors grow and become malignant. The invention is, therefore, of extreme importance since it allows the discovery and thus removal of these extremely small tumors in their very early stages, preventing the same from becoming malignant. With the preparation, in accordance with the invention, it is possible, for example, to discover tumors having a size no bigger than a pin head.

The following examples are given by way of illustration and not limitation:

EXAMPLE 1

2.60 gms. of α-pyridyl-di-(p-acetoxyphenyl)-methane are dissolved in 100 cc. acetone. To this solution 100 gms. of tannin (tannic acid according to the U.S. Pharmacopoeia) are added with stirring and heating on a water bath. A part of the solvent is removed by boiling, and the resulting viscous mass is dried in vacuo at 20° C. over a period of one day. The crust which is then formed is pulverized. The mixture thus obtained (105 gms.) contains 5.0% acetone. It is admixed with 1197.6 gms. of tannin and ground, to thus provide a product of the following composition:

α-Pyridyl-di-(p-acetoxyphenyl)-methane ___ mgms__ 20
Tannin (with 0.42% acetone) _____ gms.__ 10

EXAMPLE 2

Similar products were produced in the manner of Example 1 with other solvents and other laxatives, as shown in the table below, in which:

"152-2" means α-pyridyl-di-(p-acetoxyphenyl)-methane

"AFI" means di acetophenol isatin, i.e., Isacen, and "DFI" means diphenolisatin.

Table

| Solvent | Laxative Component | cc. of Solvent Employed per 2.60 gms. of Laxative Component and 100 gms. of Tannin | Amount of Solvent retained in the Product, percent | Method of Drying |
|---|---|---|---|---|
| Acetone | 152-2 | 100 | 5.0 | 20° C. Vacuum. |
| Do | 152-2 | 100 | 4.0 | 60° C. Vacuum. |
| Do | AFI | 100 | 1.2 | Do. |
| Do | DFI | 100 | 2.9 | Do. |
| Do | blank test | 100 | 3.9 | Do. |
| Methanol | 152-2 | 90 | 3.7 | 20° C. Vacuum. |
| Do | 152-2 | 90 | 2.2 | 50° C. Vacuum. |
| Do | 152-2 | 90 | 2.3 | 60° C. Vacuum. |
| Do | blank test | 90 | 1.7 | Do. |
| Ethanol | 152-2 | 100 | 4.0 | 20° C. Vacuum. |
| Do | 152-2 | 100 | 4.1 | 50° C. Vacuum. |
| Do | 152-2 | 100 | 4.7 | 60° C. Vacuum. |
| Do | AFI | 100 | 2.4 | Do. |
| Do | DFI | 100 | 2.4 | Do. |
| Do | DFI | 100 | 4.8 | Do. |
| Do | blank test | 120 | 6.8 | Spray Drying at 120° C. |
| Methylal | 152-2 | 70 | 6.5 | 20° C. Vacuum. |
| Do | 152-2 | 70 | 6.3 | 60° C. Vacuum. |
| Do | blank test | 70 | 7.4 | Do. |
| Dioxane | 152-2 | 90 | 16.3 | 20° C. Vacuum. |
| Methyl Glycol | 152-2 | 120 | | Spray Drying at 175° C. |

The solvents employed are specified in the first column of the above table. The laxative components employed are specified in the second column which also includes "blank tests," i.e. tests with no laxative at all, made with all the solvents except dioxane and methyl glycol. Then, the amounts of laxative component, tannin and solvent employed are specified in the third column, the amount of solvent remaining in the dried product in the fourth column, and the manner in which the product has been dried in the fifth column.

CLINICAL DATA

In the Department for X-ray Diagnosis at the Malmo General Hospital in Sweden, more than 2,000 patients were X-rayed using the preparations described above. With the use of the preparation, extremely small tumors were discovered in 12 percent of the cases, which tumors were of such small size that they could not have been detected without the aid of the new preparation. Up to the present time, about one-third of these tumors have been removed by operation and a histological examination has shown that about 12 percent of these small neoplasms had a cancerous character while 40 percent were found to have a definitely pre-cancerous character.

The above clinical data shows the great importance of the instant invention to the early discovery of cancer disease in the colon. Statistics have shown that approximately 17 percent of all deaths due to cancer are caused by malignant tumors in the large intestine including the rectum. With the use of the preparation in accordance with the invention, it is possible to discover small growths in the intestines before the same cause any symptoms in the patient, thus allowing the removal of these neoplasms as a preventive measure. The invention, therefore, presents great hope for a new type of prophylaxis of cancer occurring in the large intestine.

While the invention has been described in detail with reference to certain specific embodiments shown, various changes and modifications will become apparent to the skilled artisan which fall within the spirit of the invention and scope of the appended claims.

We claim:

1. A mixture containing a major portion of tannin and a minor portion of α-pyridyl-di-(p-acetoxy-phenyl)-methane.

2. A mixture according to claim 1, in which the α-pyridyl-di-(p-acetoxyphenyl)-methane is present in the mixture in amount 0.02–5 by weight.

3. Method for preparing the large intestine for X-ray photography which comprises irrigating the large intestine with an aqueous enema solution containing dissolved therein a mixture of a major portion of tannin and a minor portion of α-pyridyl-di-(p-acetoxy-phenyl)-methane, and thereafter irrigating the large intestine with an aqueous enema solution additionally containing an X-ray contrast medium suitable for use in intestinal roentgenology.

4. Method for the preparation of mixtures the solution of which is adapted for preparing the large intestine for X-ray photography which comprises dissolving α-pyridyl-di-(p-acetoxy-phenyl)-methane and tannin in a water miscible organic solvent, said tannin being dissolved in a major portion with respect to said α-pyridyl-di-(p-acetoxy-phenyl)-methane evaporating the solvent and recovering the dry mixture formed.

5. A mixture containing a major portion of tannin and a minor portion of a laxative capable of bringing about Holzknecht's long movements of the bowels.

6. Method for preparing the large intestine for X-ray photography which comprises irrigating the large intestine with an aqueous enema solution containing dissolved therein a mixture of a major portion of tannin and a minor portion of a laxative capable of bringing about Holzknecht's long movement of the bowels, and thereafter irrigating the large intestine with an aqueous enema solution additionally containing an X-ray contrast medium for use in intestinal roentgenology.

References Cited in the file of this patent

UNITED STATES PATENTS

| | | |
|---|---|---|
| 1,624,675 | Preiswerk | Apr. 12, 1927 |
| 1,861,696 | Harth | June 7, 1932 |

OTHER REFERENCES

Hodges: J.A.M.A., vol. 153, No. 16, Dec. 19, 1953, pp. 1417–1421.

Jampel et al.: J.A.M.A., vol. 154, No. 2, Jan. 9, 1954, pp. 121–123.

Osol: "U.S. Disp.," 24th ed., 1947, Lippincott, pp. 1181–1184.

J.A.P.A., Prac. Ph. Ed., vol. 13, No. 2, February 1952, p. 113.

Hubacker et al.: J.A.P.A., Sci. ed., vol. 42, No. 1, January 1953, pp. 23–30.

"Isacen," Roche, Oct. 18, 1929 (12 pp.).